(12) United States Patent
Wang et al.

(10) Patent No.: US 12,536,679 B2
(45) Date of Patent: Jan. 27, 2026

(54) APPLICATION MATCHING METHOD AND APPLICATION MATCHING DEVICE

(71) Applicant: SAMSUNG ELECTRONICS CO., LTD., Suwon-si (KR)

(72) Inventors: Meng Wang, Guangzhou (CN); Xiaorong Liang, Guangzhou (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 255 days.

(21) Appl. No.: 18/128,751

(22) Filed: Mar. 30, 2023

(65) Prior Publication Data

US 2023/0326046 A1 Oct. 12, 2023

(30) Foreign Application Priority Data

Apr. 12, 2022 (CN) .......................... 202210383832.0

(51) Int. Cl.
*G06T 7/33* (2017.01)
*G06F 3/04817* (2022.01)
*G06V 30/262* (2022.01)

(52) U.S. Cl.
CPC .......... *G06T 7/344* (2017.01); *G06F 3/04817* (2013.01); *G06V 30/274* (2022.01)

(58) Field of Classification Search
CPC ..... G06T 7/344; G06F 3/04817; G06F 40/30; G06F 40/289; G06V 30/274; G06V 10/82; G06V 20/62; G06N 3/08
See application file for complete search history.

(56) References Cited

U.S. PATENT DOCUMENTS

2014/0282063 A1* 9/2014 Hui ..................... G06F 3/04817
715/746
2020/0057914 A1* 2/2020 Hintz ..................... G06F 18/21

FOREIGN PATENT DOCUMENTS

| CN | 105574186 A | 5/2016 |
|---|---|---|
| CN | 106528094 A | 3/2017 |
| CN | 106547839 A | 3/2017 |
| CN | 108920580 A | 11/2018 |
| CN | 110704104 A | 1/2020 |
| CN | 111626076 A | 9/2020 |
| CN | 112507192 A | 3/2021 |

(Continued)

OTHER PUBLICATIONS

Xiaoxue Zang, Ying Xu, and Jindong Chen. 2021. Multimodal Icon Annotation For Mobile Applications. In Proceedings of the 23rd International Conference on Mobile Human-Computer Interaction (MobileHCI '21). Association for Computing Machinery, New York, NY, USA, Article 8, 1-11. (Year: 2021).*

(Continued)

*Primary Examiner* — Daniel F Hajnik
*Assistant Examiner* — Chris Alejandro Puntier
(74) *Attorney, Agent, or Firm* — Sughrue Mion, PLLC

(57) ABSTRACT

An application matching method that includes: acquiring a plurality of icons comprising a first icon corresponding to a first application and a second icon corresponding to a second application, recognizing a text in at least one of the plurality of icons, determining a category of the text, determining a similarity between the first icon and the second icon based on a category determination result of the text, and determining whether the first application matches the second application based on the similarity.

18 Claims, 14 Drawing Sheets

(56) References Cited

FOREIGN PATENT DOCUMENTS

| | | | |
|---|---|---|---|
| KR | 10-2015-0134519 A | 12/2015 | |
| KR | 101624276 B1 * | 5/2016 | ............ G06F 11/30 |

OTHER PUBLICATIONS

Minaee, Shervin, and Yao Wang. "Text extraction from texture images using masked signal decomposition." 2017 IEEE Global Conference on Signal and Information Processing (GlobalSIP). IEEE, 2017. (Year: 2017).*

Communication dated Sep. 28, 2025, issued by The State Intellectual Property Office of People's Republic of China in Chinese Application No. 202210383832.0.

* cited by examiner

| App | Icon A | Icon B | Similarity |
|---|---|---|---|
| XXBI |  TEACHERS |  POSTGRADUATE | 0.99 |
| XXDU |  |  LARGE WORD VERSION | 0.99 |
| XXMEI | XXMEI  618 CARNIVAL | XXMEI  DOUBLE-FOLD EYELID FESTIVAL | 0.54 |

FIG. 1B (Related Art)

| App | Icon A | Title A | Icon B | Title B | Similarity |
|---|---|---|---|---|---|
| 통신망 | (Gardener Version icon) | XXSHU GARDENER VERSION | (Parent Version icon) | XXSHU | 0.75 |

| Icon | Text | Text coordinates | Category |
|---|---|---|---|
|  | TEACHERS | [47,155]<br>[155,155]<br>[155,193]<br>[47,193] | Topic |
|  | LARGE WORD VERSION | [62,538]<br>[601,538]<br>[601,628]<br>[62,628] | Version |
|  | DOUBLE-FOLD EYELID FESTIVAL | [77,220]<br>[188,220]<br>[188,260]<br>[77,260] | Promotion |

| Icon A | Icon B | Text A | Text B | Category | Similarity |
|---|---|---|---|---|---|
|  |  | TEACHER | POSTGRADUATE | Topic | 0.45 |
|  |  | N/A | LARGE WORD VERSION | Version | 0 |

APPLICATION MATCHING METHOD AND APPLICATION MATCHING DEVICE

CROSS-REFERENCE TO RELATED APPLICATION(S)

This application is based on and claims priority under 35 U.S.C. § 119 to Chinese Patent Application No. 202210383832.0, filed on Apr. 12, 2022, in the China National Intellectual Property Administration, the disclosure of which is incorporated herein by reference in its entirety.

BACKGROUND

1. Field

The disclosure relates to a computer technology, and more specifically, to an application matching method and device.

2. Description of Related Art

At present, in application (APP) matching, similarity between respective applications is calculated generally by adopting manners of image processing and natural language processing respectively to information such as icons, titles, and description, of the applications, for example, image matching is performed with respect to the icons, and the similarity between the icons is calculated. However, in the actual situation, the icons of the applications often contain some text, the text is only treated as image information in the image matching, and semantic information of the text is not fully utilized, and which then leads to an error in image matching results and a low accuracy of the application matching.

On the one hand, in the case that there is a text in the icons, the similarity between the icons may be inaccurate. As shown in FIG. 1A, for example, "XXBI TEACHERS" and "XXBI POSTGRADUATE" are two different applications, but they would be misjudged as the same application based on the similarity between their icons (0.99) when calculated using the related art. Similarly, the applications "XXDU" and "XXDU LARGE WORD VERSION" would be misjudged as the same application based on the similarity between their icons (0.99). However, for "XXMEI", icon A and icon B correspond to the same application, but they would be misjudged as different applications based on the similarity between the icons (0.54). From this, it can be seen that the text contained in the icons affects a calculation of the similarity.

On the other hand, since the text in the icons is not included in names or description of the applications, the similarity between the obtained text information may also be inaccurate. As shown in FIG. 1B, for example, "XXSHU" is divided into two different applications "GARDENER VERSION" and "PARENT VERSION", where the similarity between the text information calculated according to the related art is 0.75, which corresponds to high similarity. Since the similarity between the icons is also very high, the two applications would be misjudged as the same application (it may be considered that the both are matched).

SUMMARY

Provided is an application matching method and an application matching device.

According to an aspect of the disclosure, an application matching method includes: acquiring a plurality of icons comprising a first icon corresponding to a first application and a second icon corresponding to a second application; recognizing a text in at least one of the plurality of icons; determining a category of the text; determining a similarity between the first icon and the second icon based on a category determination result of the text; and determining whether the first application matches the second application based on the similarity.

The determining the similarity between the first icon and the second icon based on the category determination result of the text may include: determining the similarity between the first icon and the second icon through different policies corresponding to different categories of the text.

The determining the similarity between the first icon and the second icon based on the category determination result of the text may include: determining an icon similarity between the first icon and the second icon; and determining a text similarity between text information of the first icon and text information of the second icon, the text information comprising at least one of title information and description information.

The determining the similarity between the plurality of icons through the different policies corresponding to the different categories of the text may include: based on the category determination result of the text being a first category, removing the text in the corresponding icon, and determining the icon similarity based on the icon with the text removed; and based on the category determination result of the text being a second category, supplementing the text into a text information of the corresponding icon, and determining the text similarity based on the supplemented text information of the icon.

The removing the text in the corresponding icon may include: determining an area to be processed in the icon based on semantic analysis of the icon, the area corresponding to where the text is located; and color processing the area to remove the text in the icon, based on a background color of the icon.

The supplementing the text into the text information of the corresponding icon may include: based on the category determination result of the text being a third category, supplementing the text into a title information of the icon; and based on the category determination result of the text being a fourth category, supplementing the text into a description information of the icon.

The determining the similarity between the first icon and the second icon through the different policies corresponding to the different categories of the text further may include: based on the category determination result of the text being the second category, determining an original icon similarity between the first icon and the second icon and an icon text similarity between the text in the first icon and the second icon, respectively, and determining the icon similarity based on a first weighted average value of the original icon similarity and the icon text similarity.

The first application may include a first application in a first operating system, and the second application may include a plurality of second applications in a second operating system, and the determining whether the first application matches the second application based on the similarity may include: determining a matching second application, from the plurality of second applications, that matches the first application based on the similarity between the first icon and each second icon corresponding to the plurality of second applications.

The determining the matching second application, from the plurality of second applications, based on the similarity between the first icon and each second icon corresponding to the plurality of second applications may include: based on at least one of the text similarity between the first icon and the second icon being greater than a first threshold, and the icon similarity between the first icon and the second icon being greater than a second threshold, determining the corresponding second application as the matching second application.

The determining the matching second application, from the plurality of second applications, based on the similarity between the first icon and each second icon corresponding to the plurality of second applications may include: based on at least one of the text similarity between the first icon and each second icon corresponding to the plurality of second applications being less than or equal to the first threshold, and the icon similarity between the first icon and each second icon corresponding to the plurality of second applications being less than or equal to the second threshold, determining the matching second application based on a second weighted average value of the text similarity and icon similarity between the first icon and the second icon being greater than a third threshold.

According to an aspect of the disclosure, an application matching device includes: at least one memory storing instructions; and at least one processor configured to execute the instructions to: acquire a plurality of icons comprising a first icon corresponding to a first application and a second icon corresponding to a second application; recognize a text in at least one of the plurality of icons; determine a category of the text; determine a similarity between the first icon and the second icon based on a category determination result of the text; and determine whether the first application matches the second application based on the similarity.

The at least one processor may be further configured to execute the instructions to determine the similarity between the first icon and the second icon through different policies corresponding to different categories of the text.

The similarity may include icon similarity between the first icon and the second icon, and text similarity between text information of the first icon and the second icon, the text information comprising at least one of title information and description information.

The at least one processor may be further configured to execute the instructions to: based on the category determination result of the text being a first category, remove the text in the corresponding icon, and determine the icon similarity based on the icon with the text removed; and based on the category determination result of the text being a second category, supplement the text into a text information of the corresponding icon, and determine the text similarity based on the supplemented text information of the icon.

The at least one processor may be further configured to execute the instructions to: determine an area to be processed in the icon based on semantic analysis of the icon, the area corresponding to where the text is located; and color process the area to be processed to remove the text in the icon, based on a background color of the icon.

The at least one processor may be further configured to execute the instructions to: based on the category determination result of the text being a third category, supplement the text into a title information of the icon; and based on the category determination result of the text being a fourth category, supplement the text into a description information of the icon.

The at least one processor may be further configured to execute the instructions to, based on the category determination result of the text being the second category, determine an original icon similarity between the first icon and the second icon and an icon text similarity between the text in the first icon and the second icon, respectively, and determine the icon similarity based on a first weighted average value of the original icon similarity and the icon text similarity.

The first application may include a first application in a first operating system, the second application may include a plurality of second applications in a second operating system, and the at least one processor may be further configured to execute the instructions to determine a matching second application, from the plurality of second applications, that matches the first application based on the similarity between the first icon and each second icon corresponding to the plurality of second applications.

The at least one processor may be further configured to execute the instructions to, based on at least one of the text similarity between the first icon and the second icon being greater than a first threshold, and the icon similarity between the first icon and the second icon being greater than a second threshold, determine the corresponding second application as the matching second application.

The at least one processor may be further configured to execute the instructions to, based on at least one of the text similarity between the first icon and each second icon corresponding to the plurality of second applications being less than or equal to the first threshold, and the icon similarity between the first icon and each second icon corresponding to the plurality of second applications being less than or equal to the second threshold, determine the matching second application based on a second weighted average value of the text similarity and icon similarity between the first icon and the second icon being greater than a third.

According to an aspect of the disclosure, a non-transitory computer-readable medium for stores computer readable program code or instructions which are executable by a processor to perform a method for application matching. The method includes: acquiring a plurality of icons comprising a first icon corresponding to a first application and a second icon corresponding to a second application; recognizing a text in at least one of the plurality of icons; determining a category of the text; determining a similarity between the first icon and the second icon based on a category determination result of the text; and determining whether the first application matches the second application based on the similarity.

It should be understood that the above general description and the detailed description later are only exemplary and explanatory, and do not limit the present disclosure.

BRIEF DESCRIPTION OF THE DRAWINGS

The drawings herein are incorporated into the description and constitute a part of the specification, illustrate embodiments consistent with the present disclosure, and are used together with the specification to explain principles of the present disclosure, and do not constitute an improper limitation of the present disclosure. The above and other aspects, features, and advantages of certain embodiments of the present disclosure will be more apparent from the following description taken in conjunction with the accompanying drawings, in which: embodiment;

FIGS. 1A and 1B are tables showing a similarity result based on the related art;

DETAILED DESCRIPTION

Figure 1A:
Figure 1A:
Figure 1A:
Figure 1A:
Figure 1A:
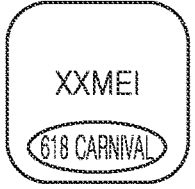
Figure 1A:

In order to enable those skilled in the art to better understand the present disclosure, embodiments of the present disclosure will be clearly and completely described below, in combination with accompanying drawings.

It should be noted that, terms "first", "second," and the like in the specification, claims and the above drawings of the present disclosure are used to distinguish similar objects, and need not be used to describe a specific order or sequential order. It should be understood that, such used data can be interchanged in appropriate situations so that the embodiments of the present disclosure described herein can be implemented in an order other than those illustrated or described herein. Implementations described in the following embodiments do not represent all implementations consistent with the present disclosure. On the contrary, they are only examples of devices and methods consistent with some aspects of the present disclosure as detailed in the appended claims.

It should be noted herein that, "at least one of several items" appearing in the present disclosure refers to three paratactic situations of "any one of the several items", "any combination of any plurality of the several items" and "all of the several items". For example, "at least one of A and B" includes only A, only B, or both A and B.

In the related art, when matching applications, image matching may be performed on icons of the applications to calculate similarity between icons, and text matching may be performed on text information, such as titles or description, of the applications to calculate similarity between the text information. However, the icons of the applications often contain some text, and semantic information of this text is not fully utilized, and then which leads to an error in matching results.

Various embodiments of the present disclosure provide an application matching method and an application matching device, which can consider not only image information of text in icons, but also semantic information of the text in the icons, to make a calculation result of similarity between applications more accurate.

Hereinafter, embodiments of the present disclosure will be described in detail with reference to the accompanying drawings, where similar reference characters denote corresponding features consistently throughout.

Figure 2:
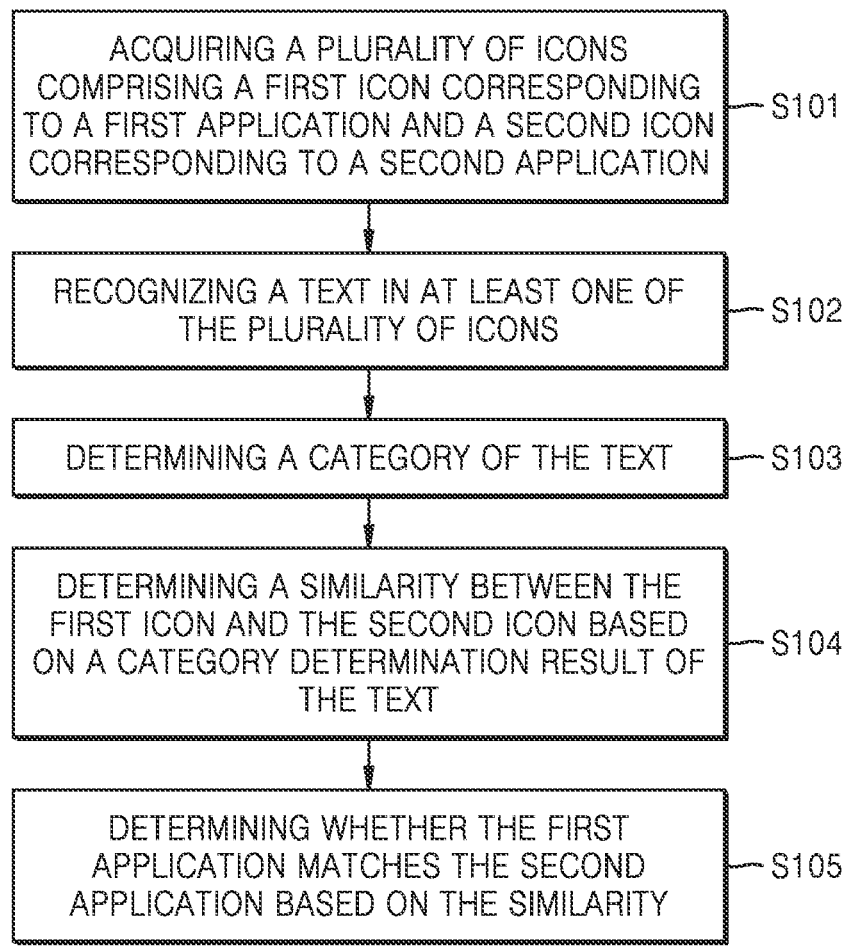
FIG. 2 is a flowchart showing an application matching method according to an embodiment.

FIG. 2 is a flowchart showing an application matching method according to an embodiment.

Referring to FIG. 2, in operation S101, a plurality of icons comprising the first icon corresponding to a first application and the second icon corresponding to a second application may be acquired. Here, the icons of the first application and the second application may be acquired from application markets of individual operating systems, and may also be acquired from a preset database storing application information, the present disclosure is not limited to this.

Figure 3:
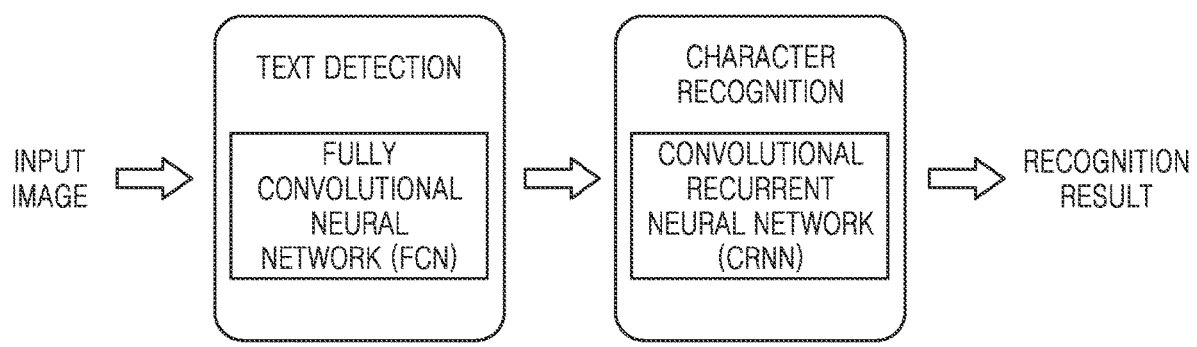
FIG. 3 is a schematic diagram showing an Optical Character Recognition (OCR) method according to an embodiment.

Next, in operation S102, a text in at least one of the plurality of icons may be recognized. Here, the text in the icon may be recognized by using, but is not limited to, an Optical Character Recognition (OCR) method based on deep learning. As an example, FIG. 3 is a schematic diagram showing an OCR method according to an embodiment. Referring to FIG. 3, the process of recognition mainly includes two parts: in first part, text detection based on a Fully Convolutional Neural Network (FCN); in second part, text recognition based on a Convolutional Recurrent Neural Network (CRNN). As shown in FIG. 3, after an icon is input, the FCN may use pixel-level annotations to analyze the connected areas to complete the detection and marking of the text position; the CRNN may be further used to recognize text sequences, and output text recognition results. According to the exemplary embodiment of the present disclosure, an OCR model may be pre-trained by the following operations:

1) collecting icon data containing various types of text in icons;

2) manually annotating the icon data, save text contained in the icon to a text file with the same name as the icon, and put the icon and the corresponding text file in a new folder to be processed;

3) performing operations, such as resizing and graying and the like, on the icon data by using scripts, and then dividing the icon data into a training data set/verification data set;

4) training the OCR model by using the training data set in operation 3), and calculating an accuracy by using the validation data set every a fixed number of training operations;

5) repeating operation 4) until the accuracy reaches a threshold or a maximum number of training operations, which indicates that the training of the OCR model ends.

Figure 4:
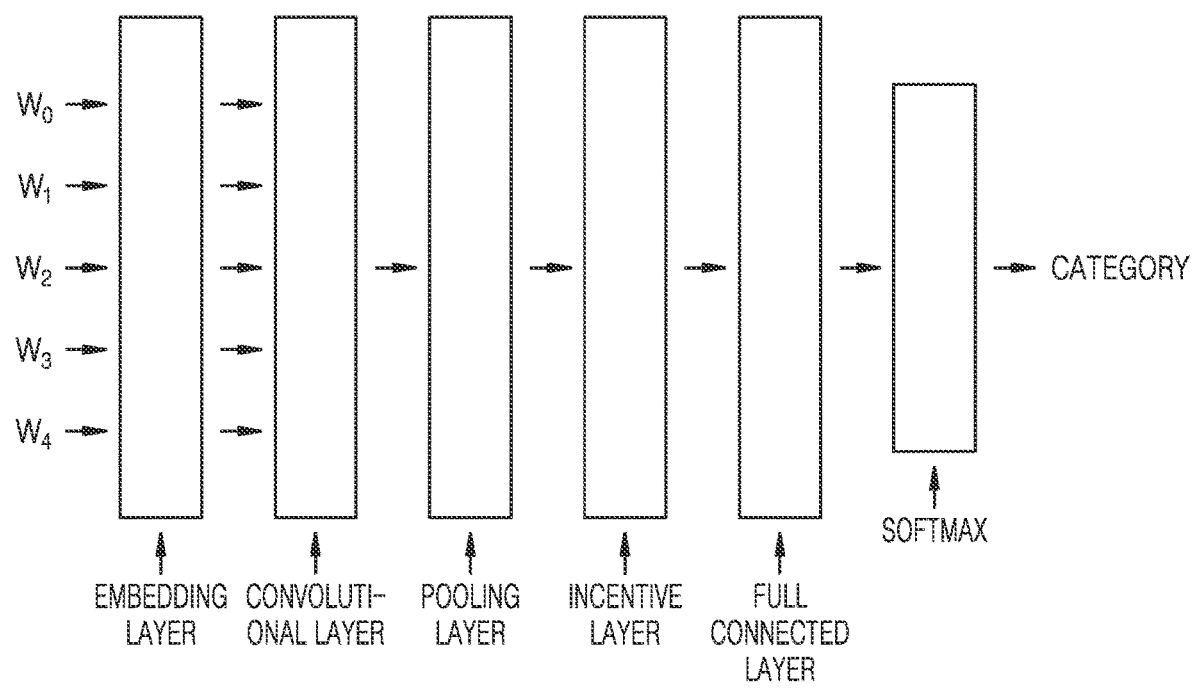
FIG. 4 is a schematic diagram showing a TextCNN model architecture according to an embodiment.

Referring back to FIG. 2, in operation S103, a category of the text may be determined. Here, because Text Convolutional Neural Networks (TextCNN) may well capture local features and obtain semantic information at different levels of abstraction, the TextCNN may be used to classify the text to determine the category of the text. However, the present disclosure is not limited to this, those skilled in the art may also classify the text by using other classification models according to an actual situation. As an example, FIG. 4 is a schematic diagram showing a TextCNN model architecture according to an embodiment. Referring to FIG. 4, a TextCNN model may consist of an embedding layer, a convolutional layer, a pooling layer, an incentive layer, a full connected layer and a Softmax layer. On this basis, with respect to word vectors ($W_0$, $W_1$, $W_2$, $W_3$, $W_4$), vector features may be extracted in the convolution operation, fixed length vectors may be obtained after averaging pooling, and after full connected, the probabilities of each category may be calculated by using a Softmax activation function. According to the exemplary embodiment of the present disclosure, the TextCNN model may be pre-trained by the following operations:

1) collecting icon data containing various types of text in icons;
2) manually annotating the icon data, save text contained in the icons to a text file with the same name as the icon, and put the icon and the corresponding text file in a new folder to be processed;
3) summarizing the text in operation 2), and annotating categories of the text;
4) filtering text data by using scripts, and then dividing the text data into a training data set/verification data set;
5) training the TextCNN model by using the training data set in operation 4), and calculating an accuracy by using the validation data set every a fixed number of training operations;
6) repeating operation 5) until the accuracy reaches a threshold or a maximum number of training operations, which indicates that the training of the TextCNN model ends.

Referring back to FIG. 2, in operation S104, a similarity between the first icon and the second icon may be determined based on a category determination result of the text. Here, the similarity may include icon similarity and text similarity. Further, the icon similarity may be similarity between the icons of the first application and the second application, and the text similarity may be similarity between text information of the first application and the second application. Further, the text information may include at least one of title information and description information about the applications.

According to the exemplary embodiment of the present disclosure, the similarity between the first application and the second application may be determined through different policies based on different categories of the text. Here, when the category of the text is determined as a first category, the text in the icon of the at least one application may be removed, and the icon similarity may be calculated based on the icon in which the text is removed. Further, an area to be processed in the icon of the at least one application may be determined by semantic analysis of the icon of the at least one application. Here, the area to be processed may include an area where the text is located. Then, the area to be processed may be color processed according to background color of the icon of the at least one application, to remove the text in the icon of the at least one application. In this exemplary embodiment, the first category may be a promotion class, which is used to indicate that content of the text is promotion information, and the promotion information will affect a calculation of the icon similarity. Therefore, the text of the promotion class in the icon may be removed, and the part used to modify the text of the promotion class may also be removed, and then the icon similarity may be calculated to improve the accuracy of the calculation of the icon similarity.

According to the exemplary embodiment of the present disclosure, the text in an icon may be removed based on, but not limited to, a Fully Convolutional Neural Network (FCN). Here, the FCN may take an icon of any size as an input and generate a segmentation image with the same size. Further, the FCN may be pre-trained by the following operations:

1) collecting icon data containing various types of text in icons;
2) manually annotating the icon data, and annotating areas to be segmented in the icons;
3) performing operations, such as resizing and the like, on the icon data by using scripts, and then dividing the icon data into a training data set/verification data set;
4) training the FCN by using the training data set in operation 3), and calculating an accuracy by using the validation data set every a fixed number of training operations;
5) repeating operation 4) until the accuracy reaches a threshold or a maximum number of training operations, which indicates that the training of the FCN ends.

In addition, according to the exemplary embodiment of the present disclosure, when the category of the text is determined as a second category, the text in the icon of the at least one application may be supplemented into the text information of the at least one application, and the text similarity is calculated based on the supplemented text information. Here, the second category may be a non-promotion class. According to the exemplary embodiment of the present disclosure, the second category may be further divided into a third category (e.g., a topic class) and a fourth category (e.g., a version class). Further, when the category of the text is determined as the third category, the text in the icon of the at least one application may be supplemented into the title information of the at least one application; when the category of the text is determined as the fourth category, the text in the icon of the at least one application may be supplemented into the description information of the at least one application. The third category, i.e. the topic class, is used to indicate that the content of the text is topic information, and the topic information is associated with the title of the application, which will affect the calculation of the text similarity. Therefore, the text of the topic class may be supplemented into the title information of the application. The fourth category, i.e. the version class, is used to indicate that the contents of the text is version information, and the version information is associated with the description of the application, which will also affect the calculation of the text similarity. Therefore, the text of the topic class may be supplemented into the description information of the application.

According to the exemplary embodiment of the present disclosure, when the text similarity of the first application and the second application is calculated, title similarity between the title information and description similarity between the description information, of the first application and the second application may be calculated, respectively, and then the title similarity and the description similarity are weighting calculated, and a result of the weighting calculation is used as final text similarity. Here, in the weighting calculation, the respective weights of the title similarity and the description similarity may be determined by those skilled in the art according to an actual situation, and the present disclosure is not limited to this. After the title similarity and the description similarity is calculated, respectively, the text similarity is obtained by first calculating the title similarity and the description similarity and then weighted calculating, which improves the accuracy of the calculation of the text similarity.

According to the exemplary embodiment of the present disclosure, when the category of the text is determined as the second category, original icon similarity between the icons of the first application and the second application and icon text similarity between the text in the icons may be calculated, respectively, and a first weighted average value of the original icon similarity and the icon text similarity is calculated, as the icon similarity. Here, in the weighting calculation, the respective weights of the original icon similarity and the icon text similarity may be determined by those skilled in the art according to an actual situation, and the present disclosure is not limited to this. By adding the icon text similarity of the text of the second category to the calculation of the icon similarity, the semantic information of the text in the icon may be further used to improve reliability of the calculation of the icon similarity.

Next, in operation S105, whether the first application matches the second application may be determined based on the similarity.

According to the exemplary embodiment of the present disclosure, when the icon similarity or the text similarity is greater than a first predetermined threshold, it may be determined that the first application matches the second application. In addition, when the icon similarity and the text similarity both are not greater than the first predetermined threshold, a weighted mean of the icon similarity and the text similarity may be further calculated, as the similarity between the first application and the second application, and when the weighted mean is greater than a second predetermined threshold, it may be determined that the first application matches the second application.

The application matching method according to the present disclosure may be applied to a scene in which a user, when replaces his/her mobile phone, migrates applications. For example, when the user replaces his/her mobile phone, it generally need to migrate the applications, however, when migrating the applications between different operating systems, the application matching method of the present disclosure may be used to match the applications in different systems, and then according to a matching relationship between the applications, a corresponding application is found in an application market of a new mobile phone to be downloaded and installed. When matching the applications, information, such as titles, description, icons and so on, of the applications may be acquired from an IOS/Android application market, respectively, then the three kinds of information are adopt with methods of natural language processing and image processing, similarity between the applications may be calculated based on a text category in the icon of each application, and the similarity may be used to confirm the matching relationship between the applications of the different operating systems.

In this case, the first application may include a first application in a first operating system, and the second application may include a plurality of second applications in a second operating system. Further, the second application matching the first application may be determined from among the plurality of the second applications based on the similarity between the first application and each second application, to realize cross-system matching of the applications. It should be understood that, the cross-system matching of the applications described above is only exemplary, and the first operating system and the second operating system described above may also be the same operating system, that is, the first application and the second application may be applications in the same operating system. In other words, according to the application matching method of the present disclosure, the first operating system and the second operating system described above may be the same operating system or different operating systems, and the present disclosure is not limited to this. According to the exemplary embodiment of the present disclosure, based on the similarity between each second application and the first application, the second application matching the first application may be determined from among the plurality of the second applications by a preset matching rule. Here, with respect to any second application, when the text similarity between the second application and the first application is greater than a first threshold or the icon similarity between the second application and the first application is greater than a second threshold, the second application may be determined as the second application matching the first application. Further, when there is no second application of which the text similarity is greater than the first threshold or the icon similarity is greater than the second threshold from among the plurality of second applications, with respect to any second application, a second weighted average value of the text similarity and icon similarity between the second application and the first application may be calculated, and when the second weighted average value is greater than a third threshold, the second application may be determined as the second application matching the first application. Here, the first threshold, the second threshold and the third threshold can be determined by those skilled in the art according to the actual situation, and the present disclosure is not limited to this.

According to another exemplary embodiment of the present disclosure, in order to further improve the reliability of the calculation of the icon similarity, when the similarity between the icons of the first application and the second application is calculated, a first icon similarity between the first application and the second application icon may be calculated using a first model, and a second icon similarity between the first application and the second application icon may be calculated using a second model, the first icon similarity and the second icon similarity are weighting calculated, and then, a result of the weighting calculation is used as the icon similarity between the first application and the second application. Here, in the weighting calculation, the respective weights of the original first icon similarity and the second icon similarity may be determined by those skilled in the art according to an actual situation, and the present disclosure is not limited to this. On this basis, with respect to any second application, when the text similarity between the second application and the first application is greater than the first threshold, or the icon similarity between the second application and the first application is greater than the second threshold, or the first icon similarity between the second application and the first application is greater than a fourth threshold, the second application may be determined as the second application matching the first application. Here, the fourth threshold may be determined by those skilled in the art according to an actual situation, and the present disclosure is not limited here.

According to the exemplary embodiment of the present disclosure, the above-mentioned text similarity may be calculated, but not limited to, based on a word2vec model. Here, the word2vec model is a deep learning model, which is mainly classed into a Continuous Bag-Of-Words (CBOW) model and a Skip-Gram model. Those skilled in the art may choose to use respective subdivision model of the word2vec model according to an actual situation. The word2vec model may convert text content into multi-dimensional vectors by unsupervised learning and training of the text data, and represent similarity on text semantic according to similarity of vector space. Specifically, after text is word-segmented, a vector of each word may be obtained using the word2vec, and then a vector is calculated using the following formula (1), thereby obtaining the vector of the text:

$$vec = \sum_{i=1}^{m} vec_i \quad (1)$$

Here, $vec_i$ may denote a vector of the current word, m may denote a number of words in the text, and vec may denote the vector of the text.

Then, based on the obtained vector of the text, cosine similarity may be calculated by the following formula (2), thereby obtaining the similarity between two texts:

$$\text{Similarity} = \frac{vec_1 \cdot vec_2}{\|vec_1\| \|vec_2\|} \quad (2)$$

Here, $vec_1$ may denote a vector of one text, $vec_2$ may denote a vector of the other text, and Similarity may denote the similarity between the two texts.

In addition, as an example, the training of the word2vec model may be pre-trained through the following operations:
1) summarizing all text data of each application, that is, text in a title, description and icon of the each application;
2) word-segmenting all the text data corresponding to the each application to obtain text data to be trained;
3) training the text data to be trained according to a framework of the word2vec model, so as to map each word to one vector.

According to the exemplary embodiment of the present disclosure, the above-mentioned icon similarity may be calculated based on an ORB (Oriented FAST and Rotated BRIEF) model. Here, the ORB model is an image feature point extraction model of computer vision. As an example, when the ORB model is used, similarity of icons A and B may be determined through the following operations:
1) calculating and extracting descriptors of feature points of A and B, respectively;
2) calculating a distance between the descriptors of the feature points of A and B through a certain matching algorithm, such as a Brute Force algorithm, and when the distance between descriptors of some two feature points is less than a certain threshold, the two feature points are successfully matched, and the more the number of feature points are successfully matched, A and B are more similar;
3) normalizing the number of matching feature points by linear transformation and sigmoid function mapping to [0,1], for subsequent weighting calculation of the icon similarity.

Figure 5:
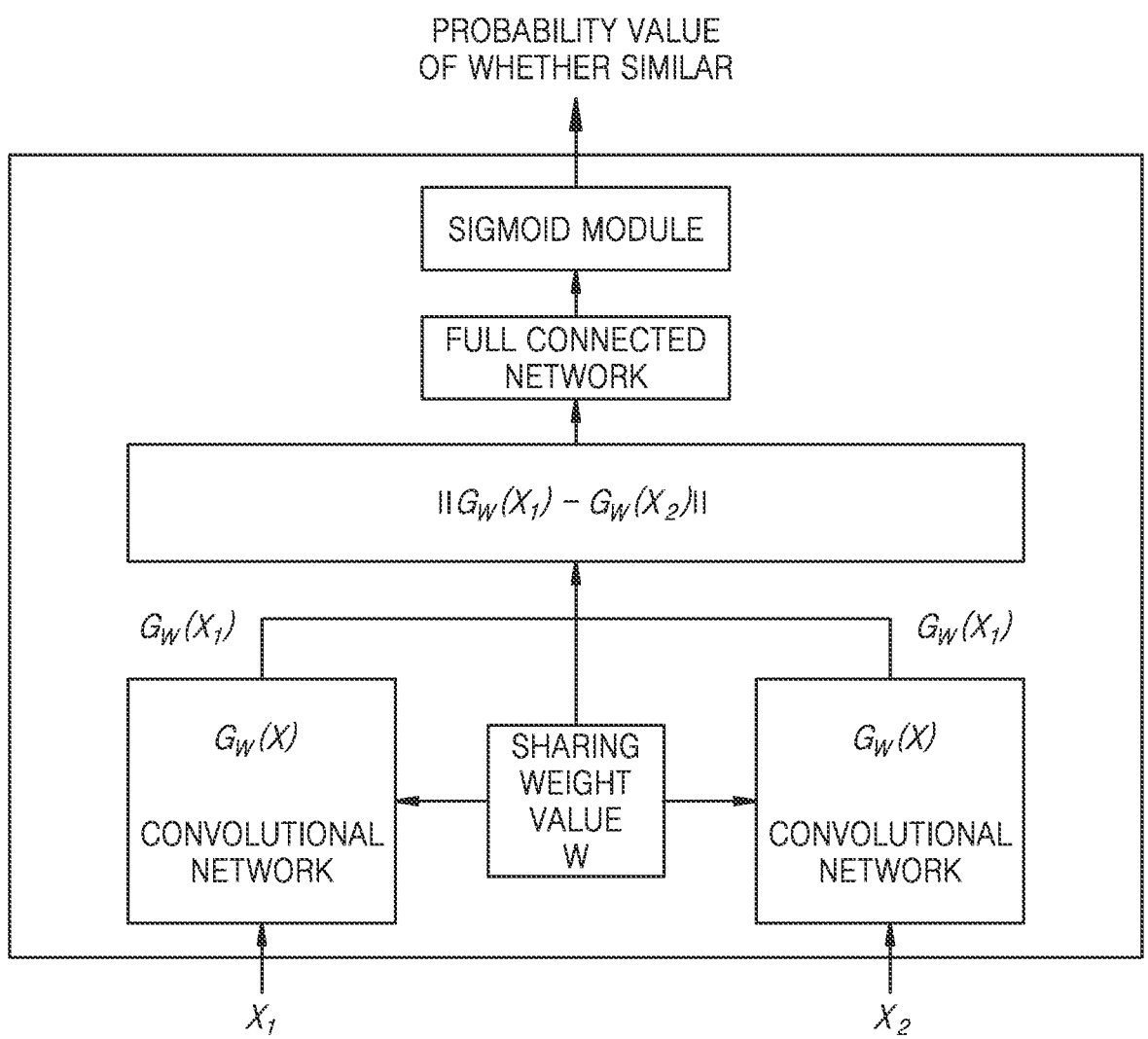
FIG. 5 is a schematic diagram showing a SiameseNet model architecture according to an embodiment.

According to another exemplary embodiment of the present disclosure, the above-mentioned icon similarity may be calculated based on a SiameseNet model. FIG. 5 is a schematic diagram showing a SiameseNet model architecture according to an embodiment. Referring to FIG. 5, the model has two inputs, which are image $X_1$ and image $X_2$, respectively, convolutional network structures of the left and right sides are the same, and they share weights; then, two vectors $G_W(X_1)$ and $G_W(X_2)$ are obtained, and a Euclidean distance is calculated by $G_W(X_1)$ and $G_W(X_2)$, that is, $E_W(X_1, X_2) = \|G_W(X_1) - G_W(X_2)\|$; Next, $E_W(X_1, X_2)$ is input to a full connected network and the sigmoid module to obtain a target output, i.e., a probability value of judging whether the two input images are similar. As an example, the SiameseNet model may be pre-trained by the following operations:
1) collecting icon data of each application, and then generating or cutting out some new icon data through scripts, to expand a data set;
2) corresponding the same App to one category and placing the same in the corresponding folder, that is, icons in the same folder have the same (or similar) category, and icons in different folders have different (or dissimilar) categories;
3) performing operations, such as resizing and graying and the like, on the icon data by using scripts, and then dividing the icon data into a training data set/verification data set;
4) establishing an icon pair data set. Specifically, one folder, for example, folder A may be randomly selected, from which two icons A1 and A2 is randomly selected to form an icon pair (A1, A2), and label data is set to 1, next, another folder, for example, folder B may be randomly selected, from which one icons B1 is randomly selected to form another icon pair (A1, B1) with the icon A1, and label data is set to 0, in this way, two pieces of icon pair data are obtained, which are (A1, A2, 1) and (A1, B1, 0), respectively;
5) randomly selecting a small batch of (e.g. 32 pieces of) icon pair data from among the icon pair data set to train the data, and calculating an accuracy by using the validation data set, every a fixed number of training operations (e.g. 500 operations);
6) repeating operation 5) until the accuracy reaches a threshold (for example, 95%) or a maximum number of training operations (e.g. 5 million operations), which indicates that the training of the SiameseNet model ends.

Figure 6:
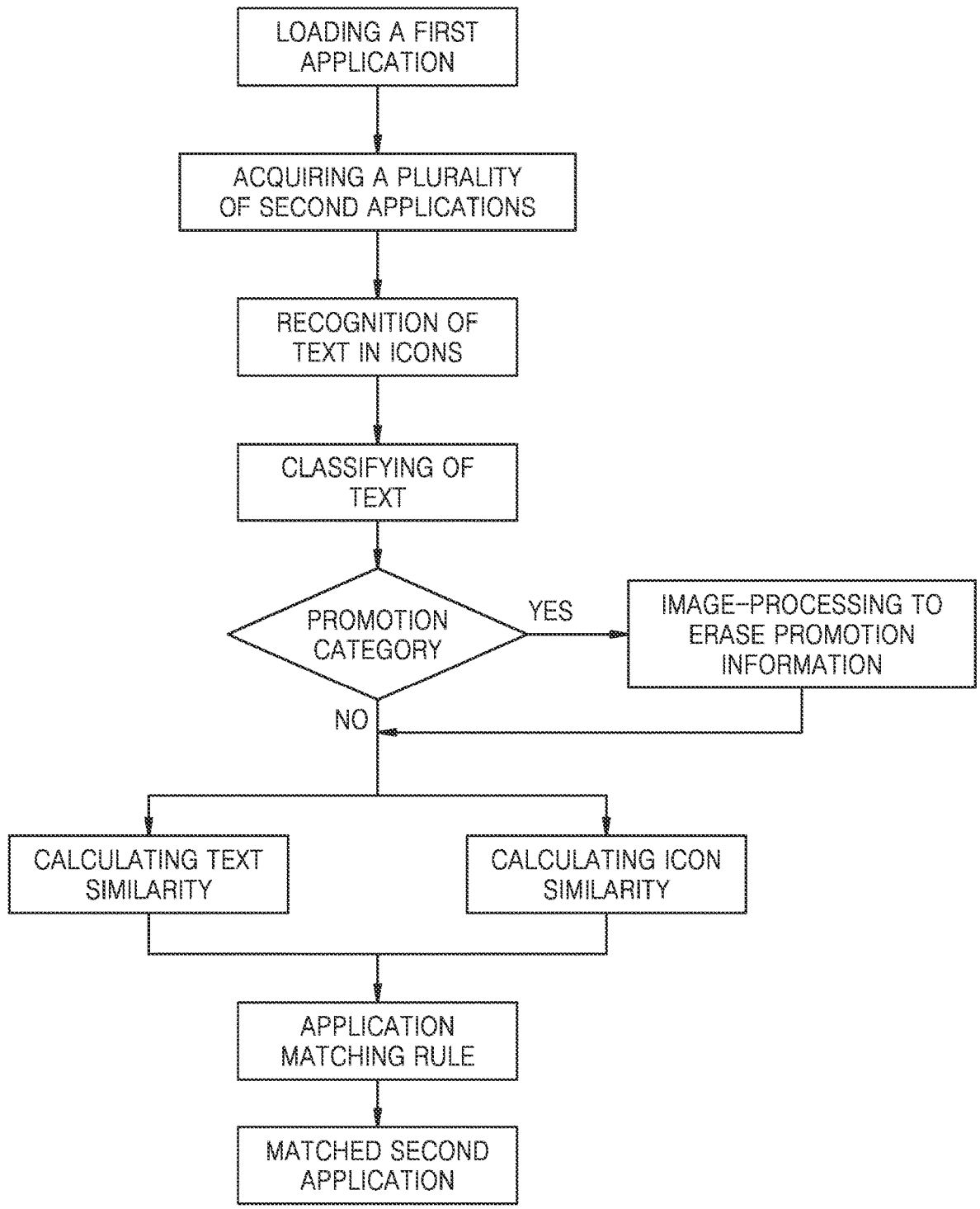
FIG. 6 is a diagram showing an application matching process according to an embodiment.

FIG. 6 is a demonstration diagram showing an application matching process according to an embodiment.

Referring to FIG. 6, in cross-system application matching, a first application in a first operating system may be loaded firstly; then, a preliminary searching may be carried out in an application market of a second operating system according to a title or description of the first application, to obtain a plurality of second applications; next, text in icons of the first application and the plurality of second applications may be recognized, and then the recognized text may be classified; next, with respect to any second application, it may be judged whether the text in the icon of this second application belongs to a promotion class, and if it belongs to the promotion class, the icon of this second application is image-processed to erase promotion information, and then icon similarity and text similarity between this second application and the first application are calculated based on the processed icon; on the contrary, if it does not belong to the promotion class, the icon similarity and the text similarity between this second application and the first application are directly calculated; next, based on the icon similarity and the text similarity between each second application and the first application, the second application matching with the first application may be determined from among the plurality of second applications according to the preset application matching rule. Here, the application matching rule may be a threshold judgment of similarity, or sort of the plurality of second applications based on size of the similarity, but it is not limited to this. It may be set by those skilled in the art according to an actual situation.

Certainly, the application matching method according to the present disclosure is not limited to the scenario of migrating applications under different operating systems, but may also be applied to any scenario that needs to automatically determine whether different applications are matched.

In order to facilitate the understanding of the above embodiments, the followings will be described in combination with FIGS. 6-8.

Figure 7:
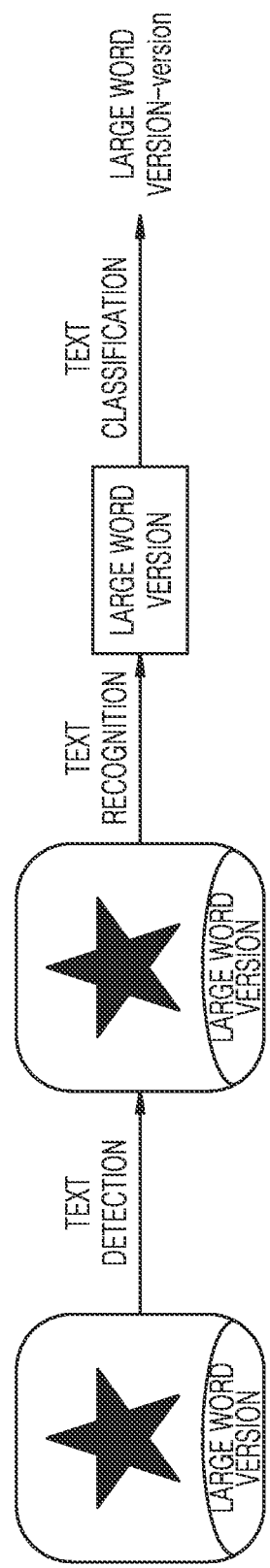
FIG. 7 is a diagram showing a text category determination process according to an embodiment.

FIG. 7 is a demonstration diagram showing a process of text category determination according to an embodiment; FIG. 8 is a demonstration diagram showing a process of removing text from an icon according to an embodiment; FIG. 9 is a demonstration diagram showing a rule of determining whether applications are matched according to an embodiment.

Referring to FIG. 7, as an example, with respect to an icon of "XXDU LARGE WORD VERSION", text "LARGE WORD VERSION" in the icon may be obtained via text detection and text recognition, and then the category of "LARGE WORD VERSION" is obtained as "version" after text classification. In addition, text coordinates in the icon may also be obtained after the text recognition, so that when the text in the icon is removed later, an area to be processed in the icon may be further determined based on the text coordinates. As an example, as shown in FIG. 8, with respect to icons of "XXBI TEACHERS", "XXDU LARGE WORD VERSION" and "XXMEI", category determination results of "topic", "version" and "promotion" may be obtained.

Figure 8:
FIG. 8 is a table showing text category determination results according to an embodiment.
Figure 8:
Figure 8:
Figure 9:
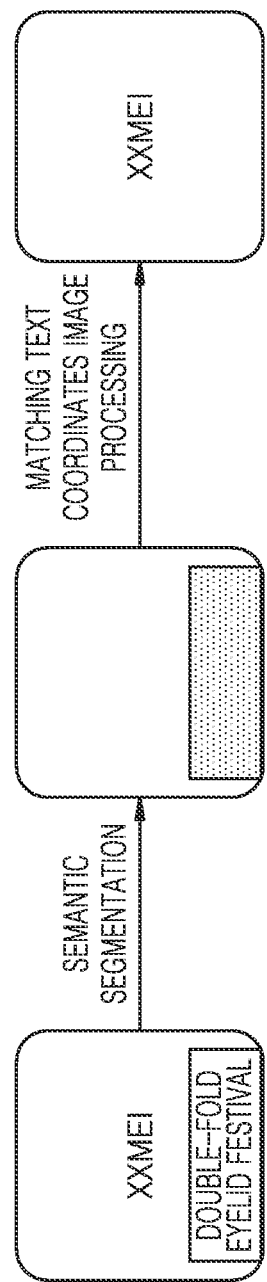
FIG. 9 is a diagram showing a process of removing text from an icon according to an embodiment.

Referring to FIG. 9, as an example, with respect to the icon of "XXMEI" in FIG. 8, since the category of "DOUBLE-FOLD EYELID FESIVAL" is determined as the promotion class, the above trained FCN may be used to semantic analysis of the icon of "XXMEI", and the area to be processed in the icon is determined by matching a result of the semantic analysis with the text coordinates, and then the area to be processed is color processed according to background color of the icon, so that the "DOUBLE-FOLD EYELID FESIVAL" in the icon of "XXMEI" is removed.

According to the exemplary embodiment of the present disclosure, as shown in Table 1 below, with respect to icons of "XXSHU GARDENER VERSION" (titled "XXSHU GARDENER VERSION") and "XXSHU PARENT VERSION" (titled "XXSHU"), since the categories of text "GARDENER VERSION" and "PARENT VERSION" in the icons are determined as a version class, "GARDENER VERSION" and "PARENT VERSION" may be supplemented to description information of the two applications, respectively, and the text similarity of the two applications is obtained as 0.5 by calculation, it can be seen that the text similarity calculated based on the supplemented description information is more accurate.

Figure 10:
FIG. 10 is a table showing text similarity of icons according to an embodiment.
Figure 10:
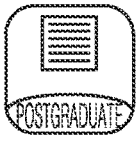
Figure 10:
Figure 10:

According to the exemplary embodiment of the present disclosure, as shown in FIG. 10, with respect to icons of "XXBI TEACHERS" and "XXBI POSTGRADUATE", since categories of text "TEACHERS" and "POSTGRADUATE" in the icons are determined as the topic class, the text similarity of icons of "TEACHERS" and "POSTGRADUATE" may also be calculated as 0.45 by using the above word2vec model; similarly, with respect to "XXDU" and "XXDU LARGE WORD VERSION", the text similarity of icons may be obtained as 0.

According to the exemplary embodiment of the present disclosure, when similarity between icons of applications is calculated, ORB icon similarity and Siamese icon similarity of the icons may be obtained by using the ORB model and the SiameseNet model described above, respectively, and then when the category of the text in the icons is determined as the topic class or version class, text similarity of the icons is added to the calculation of icon similarity. As an example, when the category of the text in the icons is determined as a topic class or version class, the icon similarity may be calculated as follows:

First icon similarity=(Icon text similarity+ORB icon similarity)/2

Second icon similarity=(Icon text similarity+Siamese icon similarity)/2

Icon similarity=(First icon similarity+Second icon similarity)/2

Figure 11:
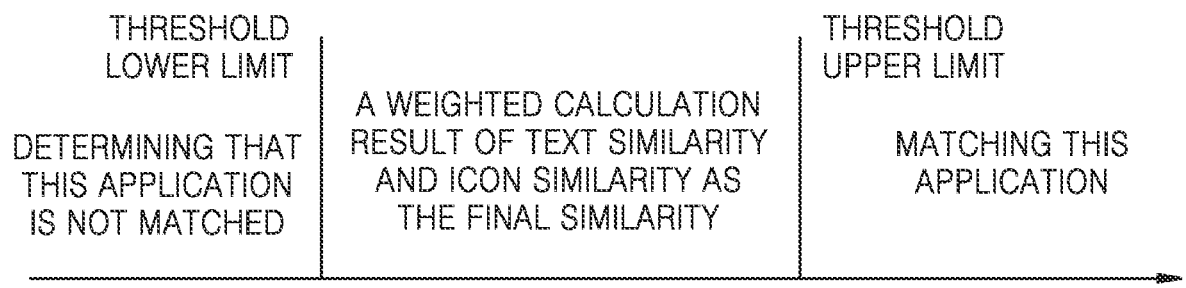
FIG. 11 is a diagram showing a rule for determining whether applications are matched according to an embodiment.

Referring to FIG. 11, after the similarity between the first application in the first operating system and the plurality of second applications in the second operating system are determined, respectively, the second application matching the first application may be determined from the plurality of second applications according to a rule shown in FIG. 11. As an example, the rule in FIG. 11 may be further refined, to obtain the following rules with respect to any second application:

1) this second application is matched when the text similarity is greater than a first threshold (e.g., 0.98);
2) this second application is matched when the ORB icon similarity is greater than a fourth threshold (e.g., 0.98);
3) this second application is matched when the icon similarity is greater than a second threshold (e.g., 0.95);
4) it is determined that this second application is not matched when the text similarity is less than a fifth threshold (e.g., 0.49);
5) it is determined that this second application is not matched when the icon similarity is less than a sixth threshold (e.g., 0.49);
6) when none of the cases 1) to 5) exists, a second weighted mean of the text similarity and the icon similarity is calculated, and this second application is matched when the second weighted mean is greater than a third threshold.

The second application matching the first application may be determined from among the plurality of second applica-

TABLE 1

| Title A | Title B | Title similarity | Text A | Text B | Category | Text similarity |
|---|---|---|---|---|---|---|
| XXSHU GARDENER VERSION | XXSHU | 0.75 | GARDENER VERSION | PARENT VERSION | Version | 0.5 | tions by traversal execution of the above rules in 1) to 6) with respect to each of the plurality of second applications.

According to the exemplary embodiment of the present disclosure, after matching relationships between a plurality of first application and a plurality of second applications are determined, a table of the matching relationships of the plurality of first application and the plurality of second applications may be obtained, to facilitate the subsequent query of the matching relationships.

The application matching method according to the exemplary embodiment of the present disclosure can recognize and classify text in icons of applications, and adopt the corresponding policy to determine similarity between the applications according to a classification result, which considers not only image information of the text in the icons, but also semantic information of the text in the icons, to make a calculation result of similarity between the applications more accurate and improve reliability of application matching.

Figure 12:
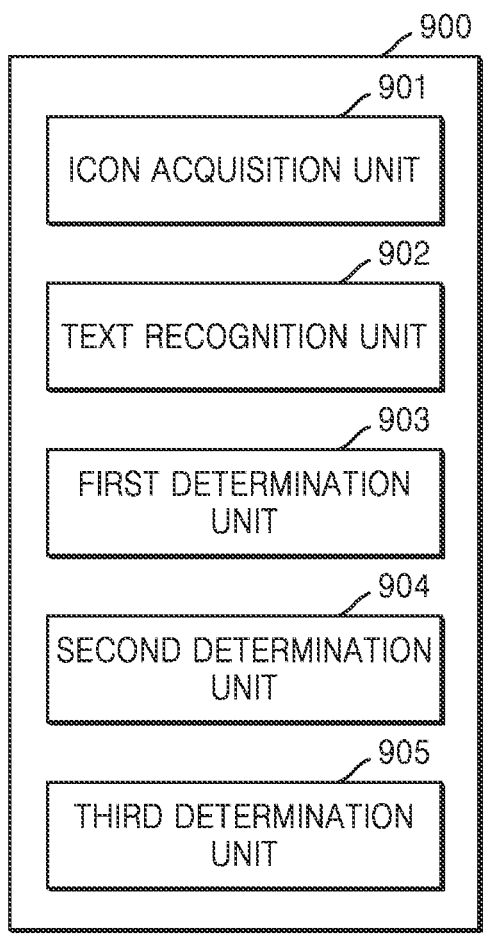
FIG. 12 is a block diagram showing an application matching device according to an embodiment.

FIG. 12 is a block diagram showing an application matching device according to an embodiment.

Referring to FIG. 12, the application matching device 900 according to the exemplary embodiment of the present disclosure may include an icon acquisition unit 901, a text recognition unit 902, a first determination unit 903, a second determination unit 904, and a third determination unit 905.

The icon acquisition unit 901 may acquire icons of a first application and a second application.

The text recognition unit 902 may recognize text in an icon of at least one of the first application and the second application.

The first determination unit 903 may determine a category of the text.

The second determination unit 904 may determine similarity between the first application and the second application based on a category determination result of the text. Here, the similarity may include icon similarity and text similarity. Further, the icon similarity is similarity between the icons of the first application and the second application, and the text similarity is similarity between text information of the first application and the second application. Furthermore, the text information may include at least one of title information and description information about the applications.

The third determination unit 905 may determine whether the first application matches the second application based on the similarity.

According to the exemplary embodiment of the present disclosure, the second determination unit 904 may determine the similarity between the first application and the second application through different policies, based on different categories of the text.

According to the exemplary embodiment of the present disclosure, when the category of the text is determined as a first category, the second determination unit 904 may remove the text in the icon of the at least one application, and calculate the icon similarity based on the icon in which the text is removed; when the category of the text is determined as a second category, the second determination unit 904 may supplement the text in the icon of the at least one application into the text information of the at least one application, and calculate the text similarity based on the supplemented text information.

According to the exemplary embodiment of the present disclosure, the second determination unit 904 may determine an area to be processed in the icon of the at least one application by semantic analysis of the icon of the at least one application, here, the area to be processed may include an area where the text is located; then, the second determination unit 904 may color process the area to be processed to remove the text in the icon of the at least one application, according to background color of the icon of the at least one application.

According to the exemplary embodiment of the present disclosure, the second category may include a third category and a fourth category. When the category of the text is determined as the third category, the second determination unit 904 may supplement the text in the icon of the at least one application into the title information of the at least one application; when the category of the text is determined as the fourth category, the second determination unit 904 may supplement the text in the icon of the at least one application into the description information of the at least one application.

According to the exemplary embodiment of the present disclosure, when the category of the text is determined as the second category, the second determination unit 904 may calculate original icon similarity between the icons of the first application and the second application and icon text similarity between the text in the icons, respectively, and calculate a first weighted average value of the original icon similarity and the icon text similarity, as the icon similarity.

According to the exemplary embodiment of the present disclosure, the first application may include a first application in the first operating system, and the second application may include a plurality of second applications in the second operating system. The third determination unit 905 may determine the second application matching the first application from among the plurality of the second applications based on the similarity between the first application and each second application.

According to the exemplary embodiment of the present disclosure, with respect to any second application, when the text similarity between the second application and the first application is greater than a first threshold or the icon similarity between the second application and the first application is greater than a second threshold, the third determination unit 905 may determine the second application as the second application matching the first application.

According to the exemplary embodiment of the present disclosure, when there is no second application of which the text similarity is greater than the first threshold or the icon similarity is greater than the second threshold from among the plurality of second applications, with respect to any second application, the third determination unit 905 may calculate a second weighted average value of the text similarity and icon similarity between the second application and the first application, and when the second weighted average value is greater than a third threshold, the third determination unit 905 may determine the second application as the second application matching the first application.

The application matching method and application matching device according to the exemplary embodiment of the present disclosure can recognize and classify text in icons of applications, and adopt the corresponding policy to determine similarity between the applications according to a classification result, which considers not only image information of the text in the icons, but also semantic information of the text in the icons, to make a calculation result of similarity between the applications more accurate and improve reliability of application matching.

Figure 13:
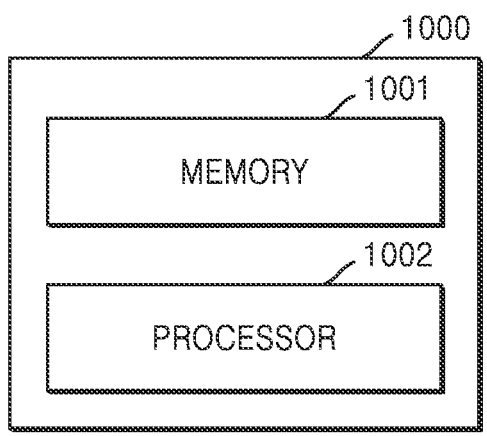
FIG. 13 is a block diagram showing an electronic apparatus according to an embodiment.

FIG. 13 is a block diagram of an electronic apparatus 1000 according to an embodiment.

Referring to FIG. 13, the electronic apparatus 1000 includes at least one memory 1001 and at least one processor 1002. The at least one memory 1001 stores a computer executable instruction set, when being executed by the at least one processor 1002, performs the application matching method according to the exemplary embodiment of the present disclosure.

As an example, the electronic apparatus 1000 may be a PC computer, a tablet device, a personal digital assistant, a smartphone, or other devices capable of executing the above instruction set. Here, the electronic apparatus 1000 does not have to be a single electronic apparatus, but may also be an assembly of any device or circuit that can execute the above instructions (or instruction set) alone or jointly. The electronic apparatus 1000 may also be part of an integrated control system or system manager, or may be configured as a portable electronic apparatus interfaced with a local or remote (e.g., via wireless transmission).

In the electronic apparatus 1000, the processor 1002 may include a central processing unit (CPU), a graphics processing unit (GPU), a programmable logic device, a dedicated processor system, a microcontroller, or a microprocessor. As an example rather than a limitation, the processor may also include an analog processor, a digital processor, a microprocessor, a multi-core processor, a processor array, a network processor, and the like.

The processor 1002 may run instructions or codes stored in the memory 1001, which may also store data. Instructions and data may also be transmitted and received through the network via a network interface device, which may adopt any known transmission protocol.

The memory 1001 may be integrated with the processor 1002, for example, a RAM or a flash memory may be arranged in an integrated circuit microprocessor or the like. In addition, the memory 1001 may include a separate device, such as an external disk drive, a storage array, or other storage device that can be used by any database system. The memory 1001 and the processor 1002 may be operatively coupled, or may communicate with each other, for example, through I/O ports, network connections, etc., so that the processor 1002 can read files stored in the memory.

In addition, the electronic apparatus 1000 may also include a video display (such as a liquid crystal display) and a user interaction interface (such as a keyboard, a mouse, a touch input device, etc.). All components of the electronic apparatus 1000 may be connected to each other via a bus and/or network.

According to an exemplary embodiment of the present disclosure, a computer-readable storage medium storing instructions may also be provided, wherein the instructions, when being executed by at least one processor, cause the at least one processor to perform the application matching method according to the present disclosure. Examples of computer-readable storage media here include: read only memory (ROM), random access programmable read only memory (PROM), electrically erasable programmable read only memory (EEPROM), random access memory (RAM), dynamic random access memory (DRAM), static random access memory (SRAM), flash memory, non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blu-ray or optical disc storage, hard disk drive (HDD), solid state hard disk (SSD), card memory (such as a multimedia card, secure digital (SD) card, or extreme digital (XD) card), magnetic tape, floppy disk, magneto-optical data storage device, optical data storage device, hard disk, solid state disk, and any other devices configured to store the computer programs and any associated data, data files and data structures in a non-transitory manner, and provide the computer programs and any associated data, data files and data structures to a processor or computer so that the processor or computer can execute the computer programs. The computer program in the above-mentioned computer readable storage medium can be executed in an environment deployed in a computer apparatus such as a client, a host, a proxy device, a server, etc. in addition, in one example, the computer programs and any associated data, data files and data structures are distributed over networked computer systems so that the computer programs and any associated data, data files and data structures are stored, accessed and executed in a distributed manner by one or more processors or computers.

According to the exemplary embodiment of the present disclosure, a computer program product, in which instructions can be executed by a processor of a computer apparatus to complete the application matching method according to the exemplary embodiment of the present disclosure, may also be provided.

After considering the description and practicing the various embodiments disclosed herein, those skilled in the art will easily think of other embodiments of the disclosure. The present disclosure aims to contain any variation, use or adaptive change of the present disclosure, this variation, use or adaptive change follows the general principles of the present disclosure, and includes well-known knowledge or conventional technical means in the technical field, which are not disclosed in the present disclosure. The description and embodiments are only considered as exemplary, and the true scope and spirit of the present disclosure are pointed out by the following claims.

It should be understood that the present disclosure is not limited to the embodiments described above and shown in the drawings, and various modifications and changes may be made without departing from scope thereof. The scope of the present disclosure is limited only by the appended claims and their equivalents.

What is claimed is:

1. An application matching method comprising:
    acquiring a plurality of icons comprising a first icon corresponding to a first application in a first operating system and a second icon corresponding to a second application in a second operating system;
    recognizing a text in at least one of the plurality of icons;
    determining a category of the text;
    determining a similarity between the first icon and the second icon based on a category determination result of the text; and
    determining whether the first application matches the second application based on the similarity,
    wherein the second application comprises a plurality of second applications in the second operating system, and
    wherein the determining whether the first application matches the second application based on the similarity comprises:
    determining a matching second application, from the plurality of second applications, that matches the first application based on the similarity between the first icon and each second icon corresponding to the plurality of second applications.

2. The application matching method of claim 1, wherein the determining the similarity between the first icon and the second icon based on the category determination result of the text comprises:
    determining the similarity between the first icon and the second icon through different policies corresponding to different categories of the text.

3. The application matching method of claim 2, wherein the determining the similarity between the first icon and the second icon based on the category determination result of the text comprises:
- determining an icon similarity between the first icon and the second icon; and
- determining a text similarity between text information of the first icon and text information of the second icon, the text information comprising at least one of title information and description information.

4. The application matching method of claim 3, wherein the determining the similarity between the plurality of icons through the different policies corresponding to the different categories of the text comprises:
- based on the category determination result of the text being a first category, removing the text in a corresponding icon, and determining the icon similarity based on the icon with the text removed; and
- based on the category determination result of the text being a second category, supplementing the text into text information of the corresponding icon, and determining the text similarity based on the supplemented text information of the icon.

5. The application matching method of claim 4, wherein the removing the text in the corresponding icon comprises:
- determining an area to be processed in the icon based on semantic analysis of the icon, the area corresponding to where the text is located; and
- color processing the area to remove the text in the icon, based on a background color of the icon.

6. The application matching method of claim 4, wherein the supplementing the text into the text information of the corresponding icon comprises:
- based on the category determination result of the text being a third category, supplementing the text into a title information of the icon; and
- based on the category determination result of the text being a fourth category, supplementing the text into a description information of the icon.

7. The application matching method of claim 4, wherein the determining the similarity between the first icon and the second icon through the different policies corresponding to the different categories of the text further comprises:
- based on the category determination result of the text being the second category, determining an original icon similarity between the first icon and the second icon and an icon text similarity between the text in the first icon and the second icon, respectively, and determining the icon similarity based on a first weighted average value of the original icon similarity and the icon text similarity.

8. The application matching method of claim 1, wherein the determining the matching second application, from the plurality of second applications, based on the similarity between the first icon and each second icon corresponding to the plurality of second applications comprises:
- based on at least one of the text similarity between the first icon and the second icon being greater than a first threshold, and the icon similarity between the first icon and the second icon being greater than a second threshold, determining the corresponding second application as the matching second application.

9. The application matching method of claim 8, wherein the determining the matching second application, from the plurality of second applications, based on the similarity between the first icon and each second icon corresponding to the plurality of second applications comprises:
- based on at least one of the text similarity between the first icon and each second icon corresponding to the plurality of second applications being less than or equal to the first threshold, and the icon similarity between the first icon and each second icon corresponding to the plurality of second applications being less than or equal to the second threshold, determining the matching second application based on a second weighted average value of the text similarity and icon similarity between the first icon and the second icon being greater than a third threshold.

10. An application matching device comprising:
- at least one memory storing instructions; and
- at least one processor configured to execute the instructions to:
- acquire a plurality of icons comprising a first icon corresponding to a first application in a first operating system and a second icon corresponding to a second application in a second operating system;
- recognize a text in at least one of the plurality of icons;
- determine a category of the text;
- determine a similarity between the first icon and the second icon based on a category determination result of the text; and
- determine whether the first application matches the second application based on the similarity,
- wherein the second application comprises a plurality of second applications in the second operating system, and
- wherein the at least one processor is further configured to execute the instructions to:
- determine a matching second application, from the plurality of second applications, that matches the first application based on the similarity between the first icon and each second icon corresponding to the plurality of second applications.

11. The application matching device of claim 10, wherein the at least one processor is further configured to execute the instructions to:
- determine the similarity between the first icon and the second icon through different policies corresponding to different categories of the text.

12. The application matching device of claim 11, wherein the similarity comprises icon similarity between the first icon and the second icon, and text similarity between text information of the first icon and the second icon, the text information comprising at least one of title information and description information.

13. The application matching device of claim 12, wherein the at least one processor is further configured to execute the instructions to:
- based on the category determination result of the text being a first category, remove the text in a corresponding icon, and determine the icon similarity based on the icon with the text removed; and
- based on the category determination result of the text being a second category, supplement the text into text information of the corresponding icon, and determine the text similarity based on the supplemented text information of the icon.

14. The application matching device of claim 13, wherein the at least one processor is further configured to execute the instructions to:
- determine an area to be processed in the icon based on semantic analysis of the icon, the area corresponding to where the text is located; and color process the area to be processed to remove the text in the icon, based on a background color of the icon.

15. The application matching device of claim 13, wherein the at least one processor is further configured to execute the instructions to:
based on the category determination result of the text being a third category, supplement the text into a title information of the icon; and
based on the category determination result of the text being a fourth category, supplement the text into a description information of the icon.

16. The application matching device of claim 13, wherein the at least one processor is further configured to execute the instructions to:
based on the category determination result of the text being the second category, determine an original icon similarity between the first icon and the second icon and an icon text similarity between the text in the first icon and the second icon, respectively, and determine the icon similarity based on a first weighted average value of the original icon similarity and the icon text similarity.

17. The application matching device of claim 10, wherein the at least one processor is further configured to execute the instructions to:
based on at least one of the text similarity between the first icon and the second icon being greater than a first threshold, and the icon similarity between the first icon and the second icon being greater than a second threshold, determine the corresponding second application as the matching second application.

18. A non-transitory computer-readable medium for storing computer readable program code or instructions which are executable by a processor to perform a method for application matching, the method comprising:
acquiring a plurality of icons comprising a first icon corresponding to a first application in a first operating system and a second icon corresponding to a second application in a second operating system;
recognizing a text in at least one of the plurality of icons;
determining a category of the text;
determining a similarity between the first icon and the second icon based on a category determination result of the text; and
determining whether the first application matches the second application based on the similarity,
wherein the second application comprises a plurality of second applications in the second operating system, and
wherein the determining whether the first application matches the second application based on the similarity comprises:
determining a matching second application, from the plurality of second applications, that matches the first application based on the similarity between the first icon and each second icon corresponding to the plurality of second applications.

* * * * *